United States Patent
Jeong

(10) Patent No.: US 8,812,022 B2
(45) Date of Patent: Aug. 19, 2014

(54) METHOD AND APPARATUS FOR INDOOR LOCATION MEASUREMENT

(75) Inventor: Seung-Hyuk Jeong, Seoul (KR)

(73) Assignee: KT Corporation, Seongnam (KR)

(*) Notice: Subject to any disclaimer, the term of this patent is extended or adjusted under 35 U.S.C. 154(b) by 94 days.

(21) Appl. No.: 13/311,197

(22) Filed: Dec. 5, 2011

(65) Prior Publication Data

US 2012/0172052 A1  Jul. 5, 2012

(30) Foreign Application Priority Data

Dec. 31, 2010 (KR) .................. 10-2010-0140370
Dec. 31, 2010 (KR) .................. 10-2010-0140374

(51) Int. Cl.
*H04W 24/00* (2009.01)
(52) U.S. Cl.
USPC .................... 455/456.1; 455/456.3
(58) Field of Classification Search
USPC .......... 455/456.1, 456.3, 456.6; 370/331, 338
See application file for complete search history.

(56) References Cited

U.S. PATENT DOCUMENTS

| | | | |
|---|---|---|---|
| 2007/0183375 A1* | 8/2007 | Tiwari | 370/338 |
| 2010/0265093 A1 | 10/2010 | Cho et al. | |
| 2011/0210843 A1* | 9/2011 | Kummetz | 340/517 |

FOREIGN PATENT DOCUMENTS

| | | |
|---|---|---|
| JP | 2010-210557 A | 9/2010 |
| KR | 10-2005-0061269 A | 6/2005 |
| KR | 10-2009-005614 A | 1/2009 |
| KR | 10-2009-0059920 B1 | 6/2009 |
| KR | 10-2009-0132970 A | 12/2009 |

\* cited by examiner

*Primary Examiner* — Sam Bhattacharya
(74) *Attorney, Agent, or Firm* — Sughrue Mion, PLLC

(57) ABSTRACT

An indoor location measuring method and apparatus are provided. An apparatus for sectionalizing an indoor area for indoor location measurement includes a reference coordinate inputting unit which receives an input of a reference coordinate corresponding to the indoor area; a sector number inputting unit which receives an input of a number of sectors per column or row in the indoor area; and a sectionalization calculating unit which sectionalizes the indoor area into a predetermined number of sectors based on the reference coordinate and the number of sectors per column or row, and calculates a coordinate of a point of a sector among the sectionalized predetermined number of sectors.

27 Claims, 8 Drawing Sheets

FIG. 1A
FIG. 1B
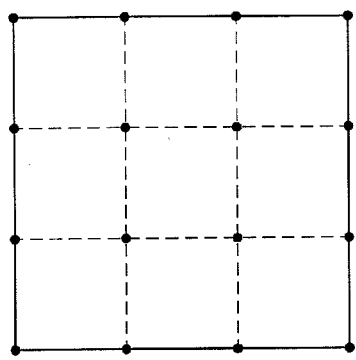
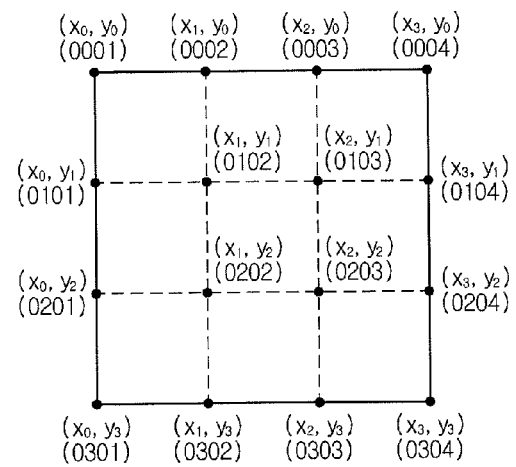
FIG. 2A
FIG. 2B
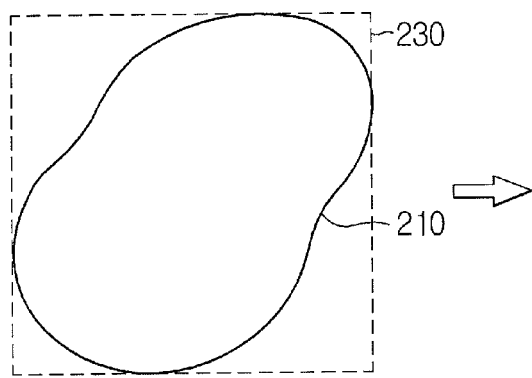
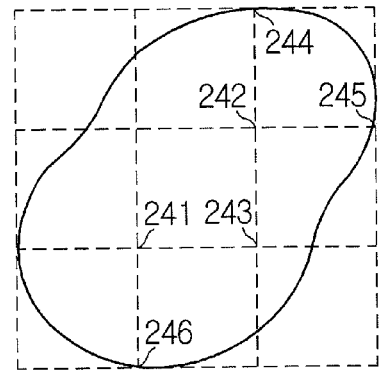

METHOD AND APPARATUS FOR INDOOR LOCATION MEASUREMENT

CROSS-REFERENCE TO RELATED APPLICATION

This application claims priority under 35 U.S.C. 119(a) from Korean Patent Application No. 10-2010-0140370, filed on Dec. 31, 2010, and Korean Patent Application No. 10-2010-0140374, filed on Dec. 31, 2010, in the Korean Intellectual Property Office, the disclosure of which are incorporated herein by reference in their entireties.

BACKGROUND

1. Field

Exemplary embodiments relate to an indoor location measuring technique, and more particularly, to a method and apparatus for dividing an indoor area into a predetermined number of sectors to measure an indoor location, and a method and apparatus for collecting information of access points.

2. Description of the Related Art

With the development of mobile communication techniques, studies have been actively made on location measuring techniques that measure a location of a mobile terminal in a communication network. Typically, a Global Positioning System (GPS)-based location measuring technique using satellites has been widely spread and used.

The GPS-based location measuring technique has a disadvantage of having to mount a GPS receiver on a mobile terminal. Also, since the GPS-based location measuring technique was developed by the U.S. Department of Defense for military use, a high-precision GPS-based location measuring technique is not disclosed. Furthermore, the GPS-based location measuring technique has limited use since the GPS-based location measuring technique is useless in buildings, for example, houses, offices, or shops, where satellite signals cannot be received. To overcome these drawbacks, attempts have been made to measure a location using an access point for a wireless local area network (WLAN) service.

The WLAN service enables mobile users to use the wireless Internet by connecting to a WLAN access point installed within a short-range area with user terminals, for example, notebook computers, personal digital assistants (PDAs), smart phones, and the like, that have WLAN cards mounted therein. Recently, to meet the increasing demand for the WLAN service, installation of access points in buildings, such as large-scaled shopping malls, and the like, has been increasing.

Since many access points have now been installed in buildings, a location of a mobile terminal can be measured in buildings by these access points, where a GPS-based location measuring technique cannot be applied.

Accordingly, research and development on a location measuring technique using an access point for a WLAN service has recently been flourishing. In the location measurement using an access point, the most important consideration is construction of a database. The larger the number of indoor access point information stored in the database and the higher the accuracy of the indoor access point information, the higher the accuracy of location measurement.

So far, a method for collecting information of outdoor access points has been used to collect information of indoor access points. This method collects information of nearby access points by using a scanning car traveling on the road. Accordingly, information of indoor access points is collected along a predetermined path in a building, such as a corridor, in the same way as information of outdoor access points is collected.

However, indoor location measurement using access point information collected only along a predetermined path in a building such as a corridor has a problem of increasing the error in location measurement. The indoor location measurement using the triangulation method uses collection location coordinates of the corridor near the center of the building where access point information is collected. Therefore, the finally obtained location coordinates may be inclined to focus on the center of the building.

Also, information of outdoor access points is automatically collected whereas information of indoor access points is manually collected. Thus, in the case of indoor location measurement, the accuracy of access point information is low and a lot of time is consumed to collect access point information.

Furthermore, indoor location measurement is based on imaginary location coordinates. Accordingly, indoor location measurement is impossible to interact with outdoor location measurement using actual latitude and longitude coordinates.

SUMMARY

One or more exemplary embodiments relate to providing a method and apparatus for collecting information of indoor access points to improve the precision in indoor location measurement.

Also, one or more exemplary embodiments relate to providing a method and apparatus for dividing an indoor area into a predetermined number of sectors to improve the precision in indoor location measurement.

Additional aspects will be set forth in the following description, and in part will be even more apparent from the examples set forth, or may be learned by practice of exemplary embodiments.

According to an aspect of an exemplary embodiment, there is provided an apparatus for sectionalizing an indoor area for indoor location measurement, the apparatus including: a reference coordinate inputting unit which receives an input of a reference coordinate corresponding to the indoor area; a sector number inputting unit which receives an input of a number of sectors per column or row in the indoor area; and a sectionalization calculating unit which sectionalizes the indoor area into a predetermined number of sectors based on the reference coordinate and the number of sectors per column or row, and calculates a coordinate of a point of a sector among the sectionalized predetermined number of sectors.

The reference coordinate may be latitude and longitude coordinates of four points of a rectangle covering the indoor area.

The sectionalization calculating unit may calculate latitude and longitude coordinates of each point of each of the sectionalized predetermined number of sectors, allocate an identity code to each of the points, and store the latitude and longitude coordinates and identity code of each of the points in a storing unit.

The apparatus may further include a transmitting unit which extracts, when receiving a sector identity code from an access point information collecting terminal via a communication network, latitude and longitude coordinates corresponding to the received sector identity code from the storing unit based on the sector identity code, and transmits the extracted latitude and longitude coordinates to the access point information collecting terminal.

The apparatus may further include an additional information inputting unit which receives an input of additional information including at least one of a building code and floor information of the indoor area, and the storing unit may store the additional information corresponding to the latitude and longitude coordinates and identity code of each of the points of each of the sectionalized predetermined number of sectors.

The sectionalization calculating unit may sectionalize the indoor area into the predetermined number of sectors by dividing a vertical side and a horizontal side of the indoor area based on the number of sectors per column or row, respectively.

The apparatus may further include a storing unit which stores the coordinate of the point of the sector calculated by the sectionalization calculating unit According to an aspect of another exemplary embodiment, there is provided a method for sectionalizing an indoor area for indoor location measurement, the method including: receiving an input of a reference coordinate corresponding to the indoor area, receiving an input of a number of sectors per column or row in the indoor area, sectionalizing the indoor area into a predetermined number of sectors based on the reference coordinate and the number of sectors per column or row, and calculating a coordinate a point of a sector among the sectionalized predetermined number of sectors.

The reference coordinate may be latitude and longitude coordinates of four points of a rectangle covering the indoor area.

The sectionalization calculating may comprise calculating latitude and longitude coordinates of each point of each of the sectionalized predetermined number of sector, allocating an identity code to each of the points, and storing the latitude and longitude coordinates and identity code of each of the points in the storing means.

The method may further include receiving an input of additional information including at least one of a building code and floor information of the indoor area, and the storing may comprise storing the additional information corresponding to the latitude and longitude coordinates and identity code of each of the points of each of the sectionalized predetermined number of sectors.

The method may further include receiving a sector identity code and a building code from an access point information collecting terminal via a communication network; extracting latitude and longitude coordinates corresponding to the received sector identity code and building code from the storing means based on the sector identity code and building code, and transmitting the extracted latitude and longitude coordinates to the access point information collecting terminal.

The sectionalization calculating may comprise sectionalizing the indoor area into the predetermined number of sectors by dividing a vertical side and a horizontal side of the indoor area based on the number of sectors per column or row, respectively.

According to an aspect of another exemplary embodiment, there is provided an apparatus for collecting access point information for indoor location measurement, the apparatus including: a collection location information inputting unit which receives an input of collection location information of a nearby access point; an access point information collecting unit which collects information of the nearby access point corresponding to the received collection location information; and a storing unit which stores the information of the nearby access point collected by the access point information collecting unit and the collection location information.

The collection location information may include one of any one of a building code, a sector identity code, a location coordinate, and floor information of a collection location.

The apparatus may further include a communication unit which communicates with a sectionalizing apparatus which sectionalizes an indoor area into a predetermined number of sectors and stores sector information. Further, the collection location information inputting unit may transmits the building code and the sector identity code of a collection location to the sectionalizing apparatus via the communication unit, and receives a location coordinate corresponding to the building code and sector identity code transmitted by the collection location information inputting unit.

The collection location information inputting unit may further transmit the floor information of the collection location to the sectionalizing apparatus via the communication unit, and receives a location coordinate corresponding to the building code, the sector identity code, and the floor information transmitted by the collection location information inputting unit.

The location coordinate may be latitude and longitude coordinates.

The sector identity code may be an identity code of each point of each sector generated by vertically and horizontally sectionalizing a rectangle coving the indoor area, and the location coordinate may be latitude and longitude coordinates of each point of each sector.

The storing unit may store sector information obtained by sectionalizing the indoor area into the predetermined number of sectors together with an interior drawing of the indoor area, and the collection location information inputting unit may display the interior drawing and sector information on a display, and when a specific location on the display is selected by a user, extracts collection location information including any one of the building code, the sector identity code, the location coordinate, and the floor information of the specific location from the sector information According to an aspect of another exemplary embodiment, there is provided a method for collecting access point information for indoor location measurement, the method including: receiving an input of collection location information of a nearby access point; collecting unit information of the nearby access point corresponding to the received collection location information; and storing the collected information of the nearby access point and the collection location information.

DESCRIPTION OF THE DRAWINGS

FIGS. 1A and 1B are diagrams illustrating the collection of indoor access point information according to an exemplary embodiment;

FIGS. 2A and 2B are diagrams illustrating the collection of indoor access point information according to another exemplary embodiment;

Figure 3:
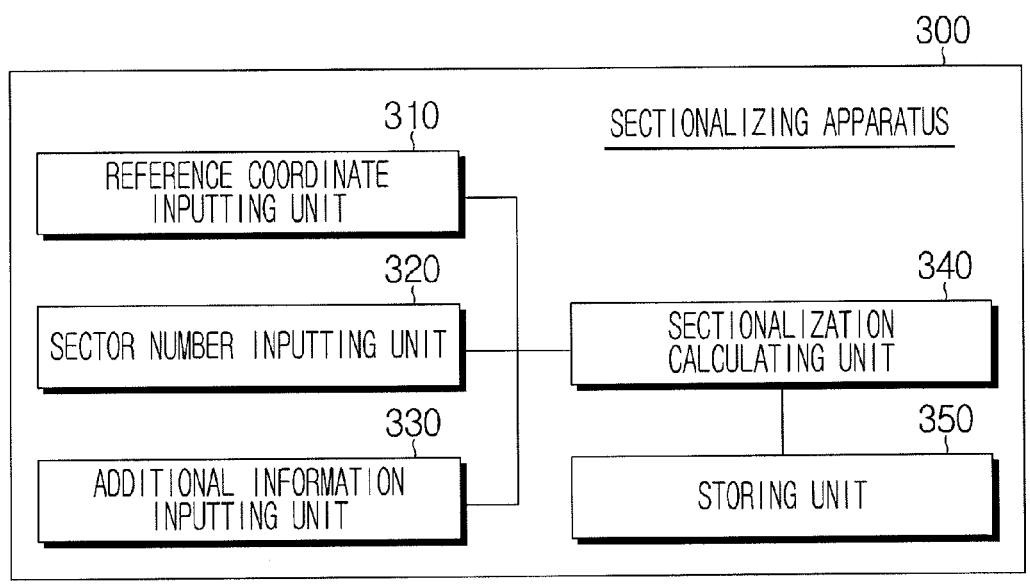
FIG. 3 is a block diagram illustrating a structure of a sectionalizing apparatus according to an exemplary embodiment.

Throughout the drawings and the detailed descriptions, unless otherwise described, the same drawing reference numerals will be understood to refer to the same elements, features, and structures. The relative size and depiction of these elements may be exaggerated for clarity, illustration, and convenience.

DETAILED DESCRIPTION OF EXEMPLARY EMBODIMENTS

The following detailed descriptions are provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

FIGS. 1A and 1B are diagrams illustrating the collection of indoor access point information according to an exemplary embodiment.

Referring to FIGS. 1A and 1B, in order to collect information of indoor access points, an indoor area of a building may be divided into a plurality of sectors, in which a location coordinate and a sector identity code may be allocated to each point of each sector. Then, information of nearby access points may be collected at an actual location corresponding to a point of a sector by an access point information collecting terminal.

Specifically, when a building has a rectangular indoor area, the indoor area may be divided into a plurality of sectors as shown in FIG. 1A. Also, a location coordinate and a sector identity code may be allocated to each point of each sector, as shown in FIG. 1B. In FIG. 1B, as an example, the sector identity code is expressed as (0001), (0002), . . . , (0304), and the location coordinate is expressed as $(X_0, Y_0) \ldots (X_n, Y_m)$. The location coordinate may be latitude and longitude coordinates.

The access point information collecting terminal may be moved to an actual location corresponding to a point of a sector, and the access point information collecting terminal collects information of nearby access points at the actual location. The access point information collecting terminal stores a sector identity code and a location coordinate of the corresponding collection location and information of nearby access points, and if necessary, transmits the sector identity code, the location coordinate, and the access point information to a collecting server via a communication network.

FIGS. 2A and 2B are diagrams illustrating the collection of indoor access point information according to another exemplary embodiment.

Unlike that of FIGS. 1A and 1B, the exemplary embodiment of FIGS. 2A and 2B exemplify a non-rectangular indoor area 210 of a building. An imaginary rectangle 230 covering the indoor area is set as shown in FIG. 2A, and the imaginary rectangle 230 is divided into a plurality of sectors as shown in FIG. 2B. Among points of the sectors, a location coordinate and a sector identity code are allocated to each of points 241, 242, 243, 244, 245, and 246 placed within the indoor area. Information of nearby access points are collected at actual locations corresponding to the points 241, 242, 243, 244, 245, and 246 by an access point information collecting terminal.

Figures 4A, 4B:
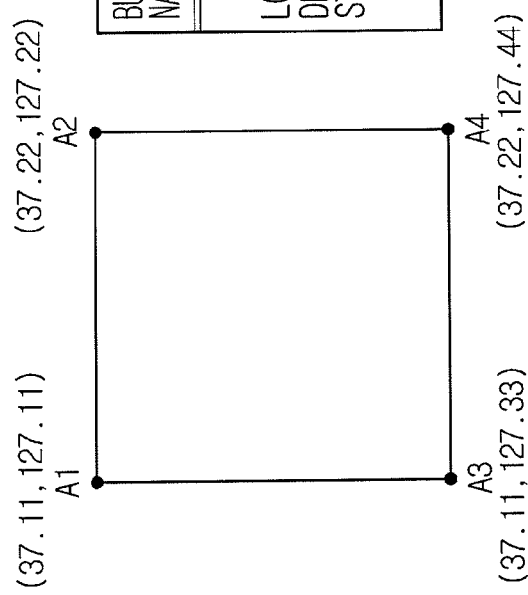
FIGS. 4A and 4B are diagrams illustrating information to be input in the sectionalizing apparatus according to an exemplary embodiment.
Figures 5A, 5B:
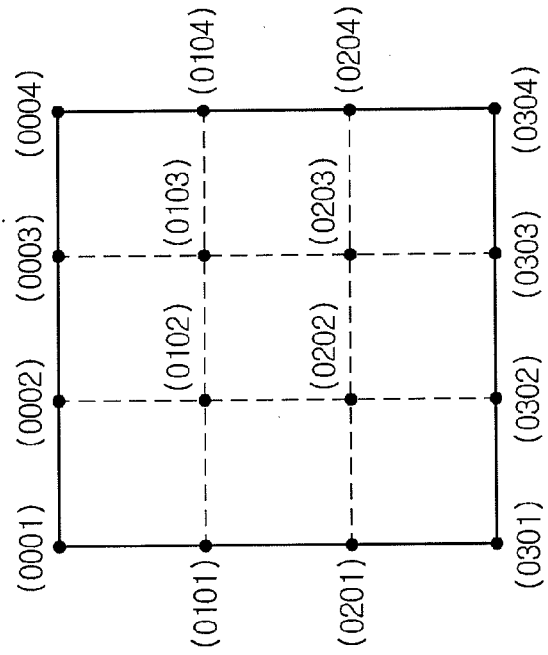
FIGS. 5A and 5B are diagrams illustrating information of each sector generated by the sectionalizing apparatus according to an exemplary embodiment.

FIG. 3 is a block diagram illustrating a structure of a sectionalizing apparatus 300 according to an exemplary embodiment. FIGS. 4A and 4B are diagrams illustrating information to be input in the sectionalizing apparatus 300 according to an exemplary embodiment. FIGS. 5A and 5B are diagrams illustrating information of each sector generated by the sectionalizing apparatus 300 according to an exemplary embodiment.

As shown in FIG. 3, the sectionalizing apparatus 300 according to an exemplary embodiment includes a reference coordinate inputting unit 310, a sector number inputting unit 320, an additional information inputting unit 330, a sectionalization calculating unit 340, and a storing unit 350.

The reference coordinate inputting unit 310 receives, from a user, an input of a reference coordinate for a target building in which information of indoor access points is to be collected. The reference coordinate may correspond to the coordinates of four points of an imaginary rectangle that covers an indoor area of the building as shown in FIG. 4B. The reference coordinate may be latitude and longitude coordinates. The latitude and longitude coordinates of the building may be identified by referring to an interior drawing of the building, and may be used as a basis to identify the coordinates of the four points of the imaginary rectangle.

Referring to FIGS. 4A and 4B, the reference coordinate inputting unit 310 receives an input of coordinates of four points A1, A2, A3, and A4 of an imaginary rectangle shown in FIG. 4A. The coordinates of the points are latitude and longitude coordinates.

The sector number inputting unit 320 receives an input of the number of sectors per column or row from the user. The number of sectors per column or row represents how many sectors the imaginary rectangle is divided into vertically or horizontally. Referring to FIGS. 5A and 5B, the imaginary rectangle is divided into three sectors vertically and horizontally as shown in FIG. 5A. In this instance, the number of sectors per column or row is 3. Although FIG. 5A shows that the number of horizontal sectors is equal to the number of vertical sectors, the number of horizontal sectors may be different from the number of vertical sectors. In this case, the sector number inputting unit 320 receives an input of the number of vertical sectors and horizontal sectors.

The additional information inputting unit 330 receives an input of a building name, a building code, and floor information from the user.

FIG. 4B illustrates an example of information received through the reference coordinate inputting unit 310, the sector number inputting unit 320, and the additional information inputting unit 330. In FIG. 4B, the building name, building code and floor information are received through the additional information inputting unit 330, the number of sectors per column or row is received through the sector number inputting unit 320, and the reference coordinate is received through the reference coordinate inputting unit 310.

The sectionalization calculating unit 340 sectionalizes an indoor area into a plurality of sectors based on information received through the reference coordinate inputting unit 310, the sector number inputting unit 320, and the additional information inputting unit 330. Also, the sectionalization calculating unit 340 calculates a coordinate of each point of each sector, allocates a sector identity code to each point, and stores the coordinate and the sector identity code in the storing unit 350 together with the additional information. For example, each point of a sector may correspond to each corner of the sector, as show in FIG. 5A.

Specifically, when the number of sectors per column or row is 3, the sectionalization calculating unit 340 sectionalizes an imaginary rectangle into nine sectors by respectively dividing the vertical side and the horizontal side of the imaginary rectangle into three as shown in FIG. 5A. The sectionalization calculating unit 340 calculates a coordinate of each point of each sector based on the reference coordinate received through the reference coordinate inputting unit 310 and the number of sectors per column or row received through the sector number inputting unit 320. Also, the sectionalization calculating unit 340 allocates a sector identity code to each point in a predetermined order, and stores the coordinate and the sector identity code in the storing unit 350 together with the additional information.

FIG. 5B illustrates information of each sector generated by the sectionalization calculating unit 340. A target building is 'LOTTE DEPARTMENT STORE', a building code is '0001', and the floor is the first floor. The latitude and longitude coordinates are calculated and stored for each sector identity code allocated to each point as shown in FIG. 5A.

The storing unit 350 stores an interior drawing of a building, and information of each sector of an indoor area of the building that is generated by the sectionalization calculating unit 340.

Although not shown in FIG. 3, the sectionalizing apparatus 300 according to this exemplary embodiment may further include an output means. The output means may extract an interior drawing of a target building from the storing unit 350 and display the extracted interior drawing on a display device. Also, in response to an input of a user, the output means may extract information of each sector generated by the sectionalization calculating unit 340 from the storing unit 350, and display the extracted information on a display device.

Figure 6:
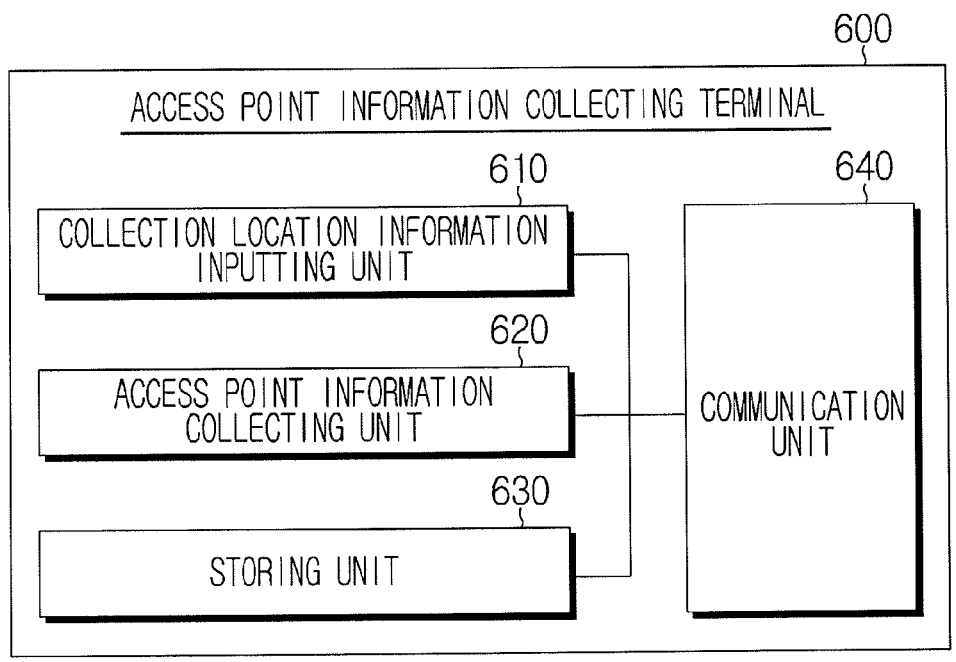
FIG. 6 is a block diagram illustrating a structure of an access point information collecting terminal according to an exemplary embodiment.

FIG. 6 is a block diagram illustrating a structure of an access point information collecting terminal 600 according to an exemplary embodiment.

As shown in FIG. 6, the access point information collecting terminal 600 according to an exemplary embodiment includes a collection location information inputting unit 610, an access point information collecting unit 620, a storing unit 630, and a communication unit 640.

The collection location information inputting unit 610 receives an input of collection location information of indoor access points from a user who collects information of the access points. Specifically, the collection location information inputting unit 610 receives an input of a building code of a target building, a sector identity code, latitude and longitude coordinates of a collection location, floor information, and the like.

Figure 7:
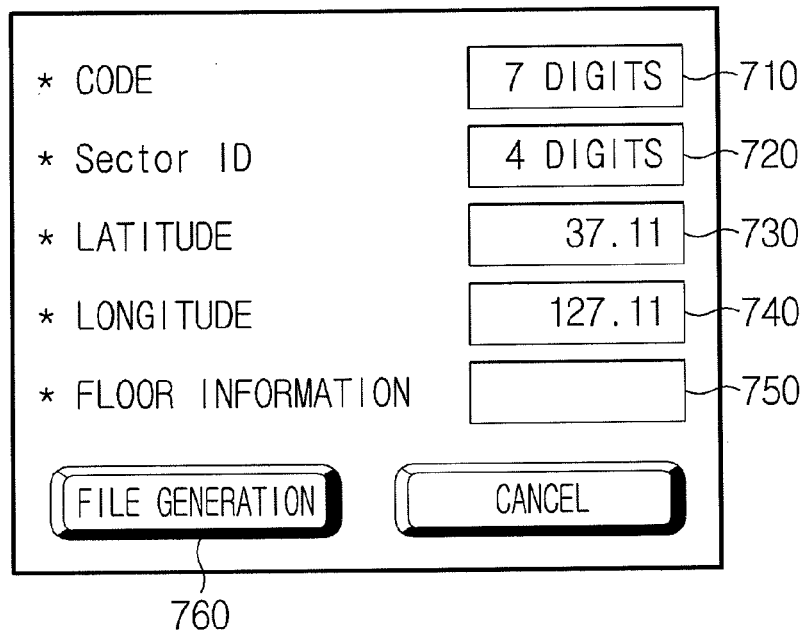
FIG. 7 is a diagram illustrating a display for inputting collection location information of an access point according to an exemplary embodiment.

FIG. 7 is a diagram illustrating a display for inputting collection location information of an access point according to an exemplary embodiment. As shown in FIG. 7, the collection location information inputting unit 610 provides a field 710 for inputting a building code, a field 720 for inputting a sector identity code, fields 730 and 740 for inputting latitude and longitude coordinates of a collection location, a field 750 for inputting floor information, and a file generation button 760.

The storing unit 630 may store information of sectors of an indoor area generated by the sectionalizing apparatus 300 as described with reference to FIGS. 4A and 4B. The collection location information inputting unit 610 extracts sector information from the storing unit 630, displays the sector information on a display device, and receives an input of a building code of a target building, a sector identity code, latitude and longitude coordinates of a collection location, and floor information.

For example, each point of each sector is indicated on an interior drawing by a separate indicator. When a user selects a point of a specific sector, a building code and a sector identity code and latitude and longitude coordinates of the selected point may be automatically input.

Alternatively, when the collection location information inputting unit 610 receives an input of a building code, a sector identity code of a specific point, and floor information from a user, the collection location information inputting unit 610 transmits the building code, sector identity code, and floor information to the sectionalizing apparatus 300 through the communication unit 640. When the collection location information inputting unit 610 receives latitude and longitude coordinates corresponding to the building code, sector identity code, and floor information from the sectionalizing apparatus 300, the collection location information inputting unit 610 automatically records the latitude and longitude coordinates in the fields 730 and 740.

When the collection location information inputting unit 610 completes the input of collection location information, the access point information collecting unit 620 collects information of nearby access points. The information of the nearby access points includes a Media Access Control (MAC) address, signal strength, and other information corresponding to the access points.

For example, when the file generation button 760 is selected in FIG. 7, the collection location information inputting unit 610 transmits a related control signal to the access point information collecting unit 620. The access point information collecting unit 620 collects information of nearby access points based on the control signal to generate a file.

After the access point information collecting unit 620 collects information of nearby access points, the access point information collecting unit 620 generates a file including the information of the nearby access points and the collection location information input through the collection location information inputting unit 610, and stores the file in the storing unit 630.

At the same time with the file storage, the access point information collecting unit 620 may transmit the information of the nearby access points and the collection location information to a predetermined object through the communication unit 640. Alternatively, the access point information collecting unit 620 may transmit the information at a predetermined time.

As described above, the access point information collecting terminal 600 of FIG. 6 collects information of nearby access points at an actual location corresponding to each point of each sector of an indoor area generated by the sectionalizing apparatus 300, and stores the collected access point information and collection location information or transmits the information to a predetermined object. Accordingly, a majority of indoor access point information is collected, and access point information is not partially collected at a specific location but is collected across distributed locations.

Figure 8:
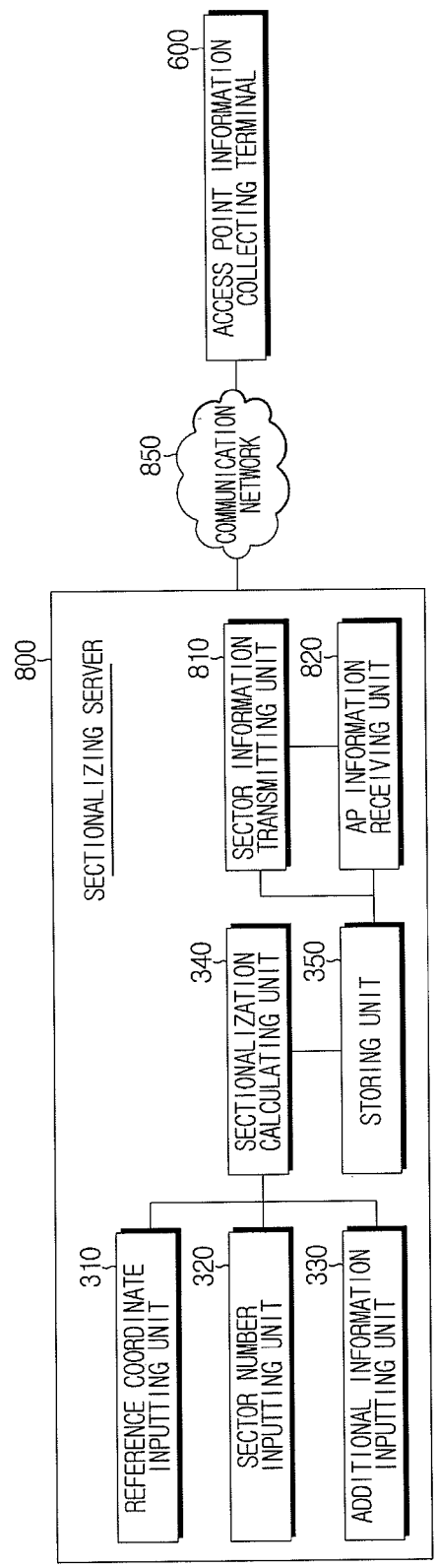
FIG. 8 is a block diagram illustrating an indoor access point information collecting system according to an exemplary embodiment.

FIG. 8 is a block diagram illustrating an indoor access point information collecting system according to an exemplary embodiment.

As shown in FIG. 8, the indoor access point information collecting system according to an exemplary embodiment includes a sectionalizing server 800 and an access point information collecting terminal 600. The access point information collecting terminal 600 of this exemplary embodiment is equal to the access point information collecting terminal 600 of FIG. 6. The sectionalizing server 800 of this exemplary embodiment corresponds to the sectionalizing apparatus 300 of FIG. 3 in the form of a server, and thus, its elements having the same reference numerals perform the same functions and operations as those of the sectionalizing apparatus 300. It should be understood that a sectionalizing apparatus includes the sectionalizing server 800 in the appended claims.

As shown in FIG. 8, the sectionalizing server 800 and the access point information collecting terminal 600 communicate via a communication network 850 to transmit and receive data. The communication network 850 may be a known wired/wireless communication network or a next-generation communication network. The exemplary embodiments are not limited to a specific kind of communication network as long as it supports communications between the sectionalizing server 800 and the access point information collecting terminal 600.

As shown in FIG. 8, the sectionalizing server 800 further includes a sector information transmitting unit 810 and an access point information receiving unit 820.

In response to the request of the access point information collecting terminal 600, the sector information transmitting unit 810 extracts sector information of a specific indoor area stored in the storing unit 350, and transmits the information to the access point information collecting terminal 600 via the communication network 850.

Specifically, the sector information transmitting unit 810 may transmit, to the access point information collecting terminal 600, sector information of a specific indoor area including, for example, an interior drawing, a building code, a sector identity code, latitude and longitude coordinates for each sector, and floor information.

Alternatively, the sector information transmitting unit 810 may receive a building code, a sector identity code, and floor information from the access point information collecting terminal 600, may extract latitude and longitude coordinates from the storing unit 350, corresponding to the received sector identity code in the sector information corresponding to the received building code and floor information, and may transmit the latitude and longitude coordinates to the access point information collecting terminal 600.

The access point information receiving unit 820 receives collection information of nearby access points collected at a specific indoor location from the access point information collecting terminal 600 via the communication network 850, and stores the collection information in the storing unit 350. The collection information includes a building code, a sector identity code, latitude and longitude coordinates of a sector, floor information, a MAC address and signal strength of an access point, and other information corresponding to the access point.

Figure 9:
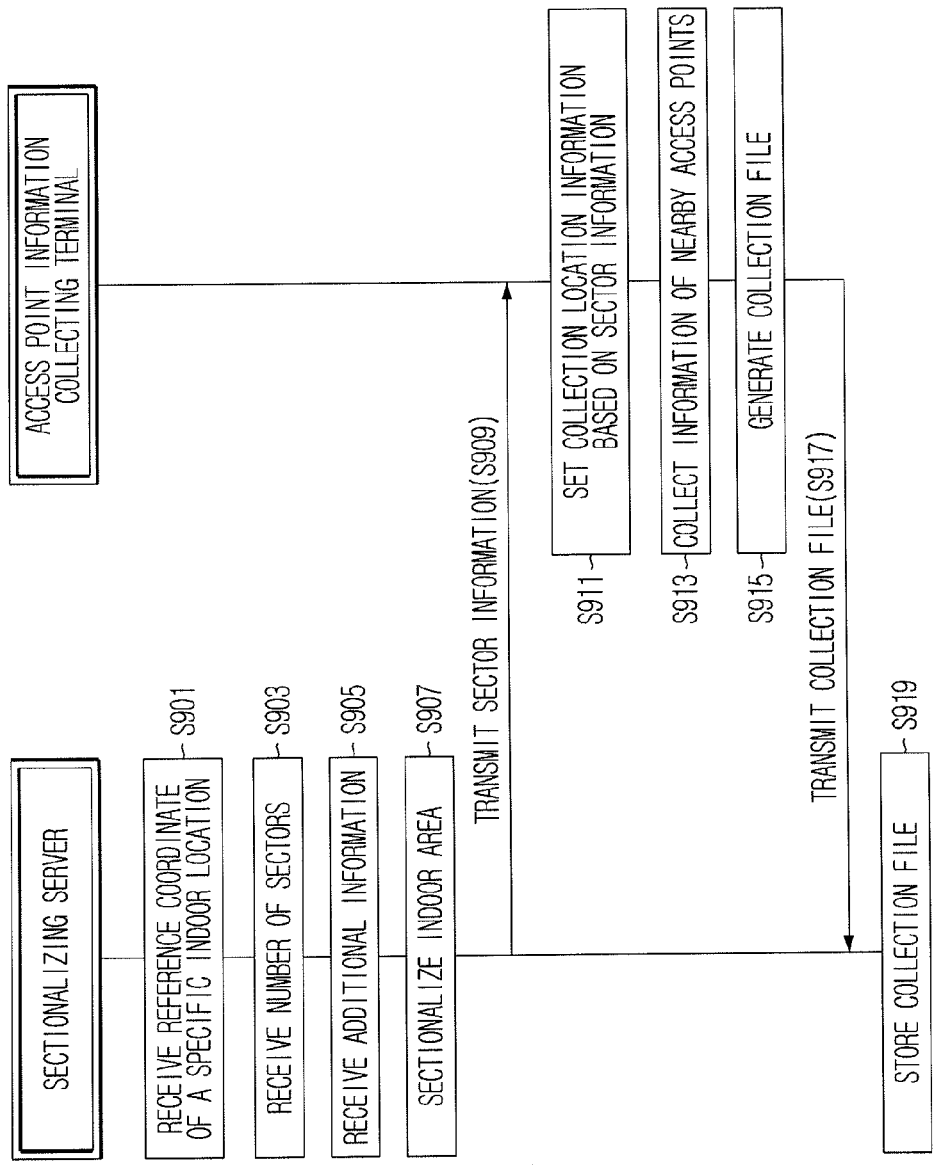
FIG. 9 is a flowchart illustrating a process for collecting access point information in the indoor access point information collecting system according to an exemplary embodiment.

FIG. 9 is a flowchart illustrating a process for collecting access point information in the indoor access point information collecting system according to an exemplary embodiment.

As shown in FIG. 9, the sectionalizing server 800 receives a reference coordinate for a specific target indoor area in which access point information is to be collected (S901). The reference coordinate may be received from an operator terminal or another interlocking device. The reference coordinate is, for example, coordinates of four points of an imaginary rectangle that covers an indoor area of a building. The reference coordinate may be latitude and longitude coordinates. The latitude and longitude coordinates of the building may be identified by referring to an interior drawing of the building, and may be used as a basis to identify the coordinates of four points of the imaginary rectangle.

After the sectionalizing server 800 receives the reference coordinate as described above, the sectionalizing server 800 receives the number of sectors per column or row in the indoor area (S903). The number of sectors per column or row may be received from an operator terminal or another interlocking device in the same way as the reference coordinate. The number of sectors per column or row represents the number of vertical sectors or the number of horizontal sectors. Referring to FIG. 5, the imaginary rectangle is divided vertically and horizontally into three sectors respectively, as shown in FIG. 5AA. In this case, the number of sectors per column or row is 3.

Next, the sectionalizing server 800 receives additional information of the indoor area, for example, a building name, a building code, and floor information (S905).

As described above, after the sectionalizing server 800 receives the reference coordinate, the number of sectors per column or row, and the additional information, the sectionalizing server 800 divides the indoor area into a plurality of sectors using the reference coordinate and the number of sectors per column or row. The sectionalizing server 800 calculates a coordinate of each point of each sector, allocates a sector identity code to each point, and stores the sector information in the storing unit 350 together with the additional information (S907).

Specifically, when the number of sectors per column or row is 3, the sectionalizing server 800 sectionalizes the imaginary rectangle into nine sectors by respectively dividing the vertical side and the horizontal side of the imaginary rectangle into three as shown in FIG. 5A. The sectionalizing server 800 calculates a coordinate of each point of each sector based on the reference coordinate and the number of sectors per column or row. Also, the sectionalization calculating unit 340 allocates a sector identity code to each point in a predetermined order, and stores the coordinate and sector identity code in the storing unit 350 together with the additional information.

An example of the sector information is shown in FIG. 5B. In FIG. 5B, a target building is 'LOTTE DEPARTMENT STORE', a building code is '0001', and the floor is the first floor. A coordinate is calculated and stored for a sector identity code of each point of each sector shown in FIG. 5A.

After the sectionalizing server 800 sectionalizes the imaginary rectangle, the sectionalizing server 800 transmits the sector information to the access point information collecting terminal 600 via the communication network 850 (S909). The sector information includes an interior drawing of a building, a building code, a sector identity code for each sector, latitude and longitude coordinates, and floor information.

The access point information collecting terminal 600 receives the sector information from the sectionalizing server 800, stores the sector information, and sets collection location information based on the sector information in response to an input of a user (S911). Specifically, the access point information collecting terminal 600 is placed at a point of a specific sector of the indoor area, and sets a sector identity code, latitude and longitude coordinates, a building code, and floor information of the corresponding location.

For example, as shown in FIG. 7, the access point information collecting terminal 600 provides a field 710 for inputting a building code, a field 720 for inputting a sector identity code, fields 730 and 740 for inputting latitude and longitude coordinates of a collection location, and a field 750 for inputting floor information. Also, the access point information collecting terminal 600 displays a file generation button 760, and indicates each point of each sector on an interior drawing by a separate indicator. When a user selects a point of a sector where the user is currently positioned, the access point information collecting terminal 600 may automatically set a building code, and a sector identity code and latitude and longitude coordinates of the selected point.

Next, the access point information collecting terminal 600 collects information of nearby access points (S913) and generates a collection file (S915). The collection file includes a building code, a sector identity code, floor information, latitude and longitude coordinates, a MAC address and signal strength of an access point, and other information corresponding to the access point.

After the collection file is generated as described above, the access point information collecting terminal 600 transmits the generated collection file to the sectionalizing server 800 via the communication network 850 (S917). The sectionalizing server 800 stores the received collection file (S919).

Figure 10:
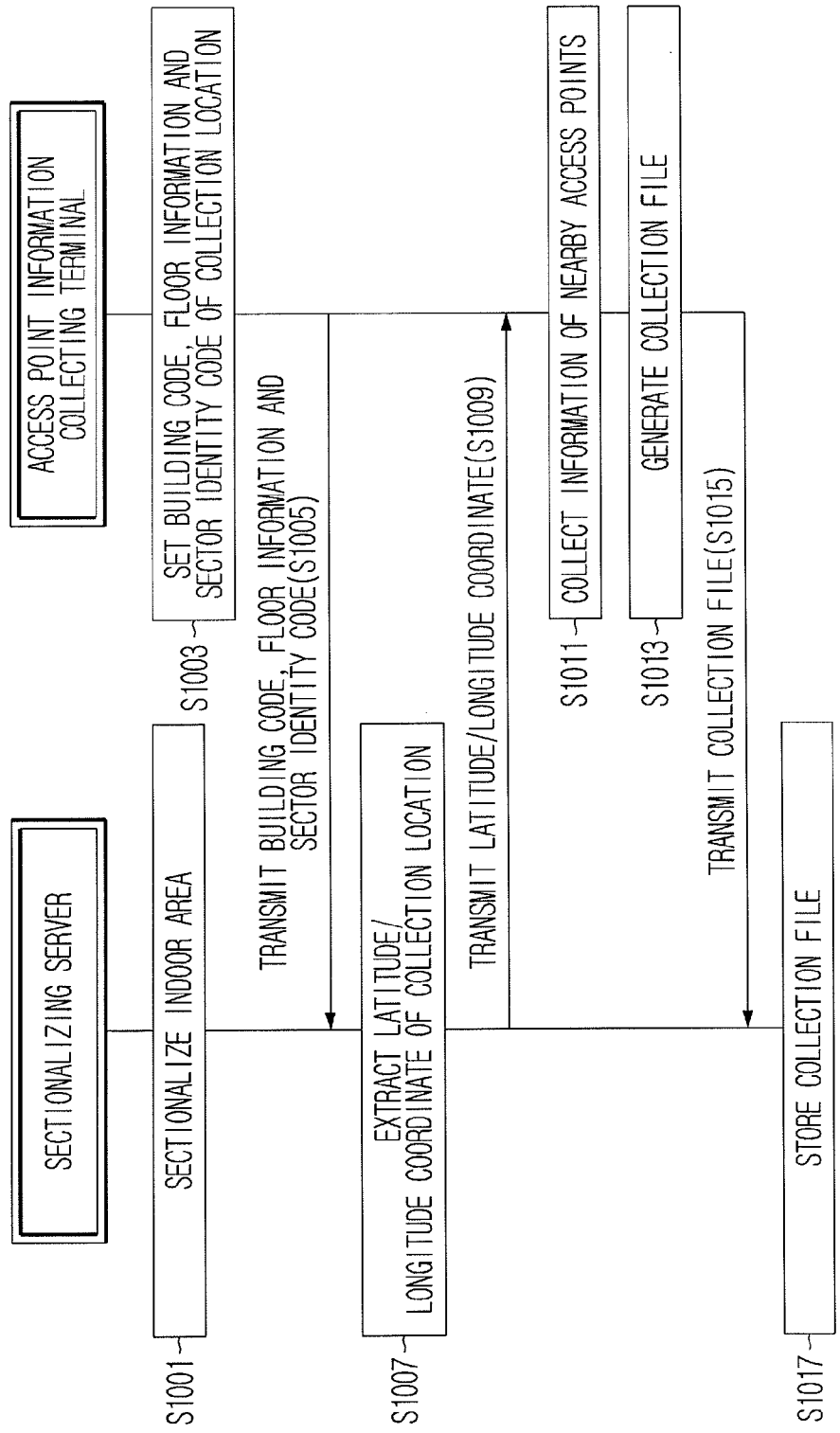
FIG. 10 is a flowchart illustrating a process for collecting access point information in the indoor access point information collecting system according to another exemplary embodiment.

FIG. 10 is a flowchart illustrating a process for collecting access point information in the indoor access point information collecting system according to another exemplary embodiment.

As shown in FIG. 10, the sectionalizing server 800 sectionalizes a specific target indoor area for collection of access point information (S1001). The operation S1001 is equal to the operations S901 to S907 of FIG. 9.

When the specific indoor area is sectionalized, the access point information collecting terminal 600 which is located at a point of a specific sector of the indoor area sets a building code, a sector identity code of the current location, and floor information in response to an input of a user (S1003).

Next, the access point information collecting terminal 600 requests latitude and longitude coordinates by transmitting the building code, sector identity code, and floor information to the sectionalizing server 800 via the communication network 850 (S1005).

In response to the request, the sectionalizing server 800 extracts latitude and longitude coordinates corresponding to the received building code, sector identity code, and floor information from the storing unit 350 (S1007), and transmits the extracted latitude and longitude coordinates to the access point information collecting terminal 600 via the communication network 850 (S1009).

Next, the access point information collecting terminal 600 collects information of nearby access points (S1011), and generates a collection file (S1013). The collection file includes a building code, a sector identity code, floor information, latitude and longitude coordinates, a MAC address and signal strength of an access point, and other information corresponding to the access point.

After the collection file is generated, the access point information collecting terminal 600 transmits the generated collection file to the sectionalizing server 800 via the communication network 850 (S1015). The sectionalizing server 800 stores the received collection file (S1017).

According to the exemplary embodiments, information of indoor access points is not partially collected at a specific location but is collected across distributed locations, so that final location coordinates are not inclined to focus on the center of an indoor area, thereby improving the accuracy in location measurement using collection location coordinates by the triangulation method.

Also, latitude and longitude coordinates can be reflected on indoor location measurement, thereby achieving accurate location measurement regardless of whether it is indoor location measurement or outdoor location measurement.

Although the exemplary embodiments show a sectionalizing apparatus and an access point information collecting terminal as separate physical equipments, the sectionalizing apparatus and the access point information collecting terminal may be integrated into one equipment. In this case, access point information may be collected using sector information immediately after sectionalization.

A method of one or more exemplary embodiments may be recorded as computer-readable program codes in non-transitory computer-readable media (CD ROM, random access memory (RAM), read-only memory (ROM), floppy disks, hard disks, magneto-optical disks, and the like) including program instructions to implement various operations embodied by a computer.

The apparatus of the exemplary embodiments, for example, the sectionalizing apparatus 300, access point information collecting terminal 600, sectionalizing server 800, etc., may include a bus coupled to every unit of the apparatus, at least one processor (e.g. central processing unit, microprocessor, etc.) that is connected to the bus for controlling the operation of the apparatus to implement that above-described functions and executing commands, and a memory connected to the bus to store the commands, received messages, and generated messages.

While this specification contains many features, the features should not be construed as limitations on the scope of the disclosure or of the appended claims. Certain features described in the context of separate exemplary embodiments can also be implemented in combination. Conversely, various features described in the context of a single exemplary embodiment can also be implemented in multiple exemplary embodiments separately or in any suitable subcombination.

Although the drawings describe the operations in a specific order, one should not interpret that the operations are performed in a specific order as shown in the drawings or successively performed in a continuous order, or all the operations are performed to obtain a desired result. Multitasking or parallel processing may be advantageous under any environment. Also, it should be understood that all exemplary embodiments do not require the distinction of various system components made in this description. The program components and systems may be generally implemented as a single software product or multiple software product packages.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for sectionalizing an indoor area for indoor location measurement, the apparatus comprising:
   a reference coordinate inputting unit which receives an input of a reference coordinate corresponding to the indoor area;
   a sector number inputting unit which receives an input of a number of sectors per column or row in the indoor area; and
   a sectionalization calculating unit which sectionalizes the indoor area into a predetermined number of sectors based on the reference coordinate and the number of sectors per column or row, and calculates a coordinate of a point of a sector among the sectionalized predetermined number of sectors.

2. The apparatus according to claim 1, wherein the reference coordinate is latitude and longitude coordinates of four points of a rectangle covering the indoor area.

3. The apparatus according to claim 1, wherein the sectionalization calculating unit calculates latitude and longitude coordinates of each point of each of the sectionalized predetermined number of sectors, allocates an identity code to each of the points, and stores the latitude and longitude coordinates and identity code of each of the points in a storing unit.

4. The apparatus according to claim 3, further comprising:
an additional information inputting unit which receives an input of additional information including at least one of a building code and floor information of the indoor area, wherein a storing unit stores the additional information corresponding to the latitude and longitude coordinates and identity code of each of the points of each of the sectionalized predetermined number of sectors.

5. The apparatus according to claim 3, further comprising:
a transmitting unit which extracts, when receiving a sector identity code from an access point information collecting terminal via a communication network, latitude and longitude coordinates corresponding to the received sector identity code from a storing unit based on the sector identity code, and transmits the extracted latitude and longitude coordinates to the access point information collecting terminal.

6. The apparatus according to claim 1, wherein the sectionalization calculating unit sectionalizes the indoor area into the predetermined number of sectors by dividing a vertical side and a horizontal side of the indoor area based on the number of sectors per column or row, respectively.

7. The apparatus for sectionalizing an indoor area for indoor location measurement according to claim 1, further comprising:
a storing unit which stores the coordinate of the point of the sector calculated by the sectionalization calculating unit.

8. The apparatus according to claim 1, further comprising:
a transmitter which is configured to transmit information on at least one of the sectionalized predetermined number of sectors to an access point information collecting terminal; and
a receiver which is configured to receive information on an access point near the at least one of the sectionalized predetermined number of sectors collected by the access point information collecting terminal based on the transmitted information.

9. The apparatus according to claim 1, wherein the sectionalization calculating unit sectionalizes the indoor area by dividing an imaginary rectangle into the predetermined number of sectors based on the reference coordinate.

10. The apparatus according to claim 9, wherein the sectionalization calculating unit divides the imaginary rectangle based on the input number of sectors per column or row.

11. The apparatus according to claim 9, wherein the sectionalization calculating unit sectionalizes the indoor area into the predetermined number of sectors based on the reference coordinate, which is identified by referring to a floor plan of an indoor space of a building and wherein the floor plan is used to determine the coordinates of the imaginary rectangle.

12. A method for sectionalizing an indoor area for indoor location measurement, the method comprising:
receiving an input of a reference coordinate corresponding to the indoor area;
receiving an input of a number of sectors per column or row in the indoor area;
sectionalizing the indoor area into a predetermined number of sectors based on the reference coordinate and the number of sectors per column or row, and calculating a coordinate of a point of a sector among the sectionalized predetermined number of sectors.

13. The method according to claim 12, wherein the reference coordinate is latitude and longitude coordinates of four points of a rectangle covering the indoor area.

14. The method according to claim 12, wherein the sectionalization calculating comprises calculating latitude and longitude coordinates of each point of each of the sectionalized predetermined number of sectors, allocating an identity code to each of the points, and storing the latitude and longitude coordinates and identity code of each of the points in the storing means.

15. The method according to claim 14, further comprising:
receiving an input of additional information including at least one of a building code and floor information of the indoor area,
wherein the storing comprises storing the additional information corresponding to the latitude and longitude coordinates and identity code of each of the points of each of the sectionalized predetermined number of sectors.

16. The method according to claim 15, further comprising:
receiving a sector identity code and a building code from an access point information collecting terminal via a communication network;
extracting latitude and longitude coordinates corresponding to the received sector identity code and building code from the storing means based on the sector identity code and building code, and
transmitting the extracted latitude and longitude coordinates to the access point information collecting terminal.

17. The method according to claim 12, wherein the sectionalization calculating comprises sectionalizing the indoor area into the predetermined number of sectors by dividing a vertical side and a horizontal side of the indoor area based on the number of sectors per column or row, respectively.

18. The method for sectionalizing an indoor area for indoor location measurement according to claim 12, further comprising:
storing, in a storage unit, the coordinate of the point of the sector calculated in the Sectionalization.

19. An apparatus for collecting access point information for indoor location measurement, the apparatus comprising:
a collection location information inputting unit which receives an input of collection location information of a nearby access point;
an access point information collecting unit which collects information of the nearby access point corresponding to the received collection location information; and
a storing unit which stores the information of the nearby access point collected by the access point information collecting unit and the collection location information.

20. The apparatus according to claim 19, wherein the collection location information includes at least one of a building code, a sector identity code, a location coordinate, and floor information of a collection location.

21. The apparatus according to claim 20, wherein the sector identity code is an identity code of each point of each sector generated by vertically and horizontally sectionalizing a rectangle coving the indoor area, the location coordinate is latitude and longitude coordinates of each point of each sector.

22. The apparatus according to claim 20, wherein the storing unit stores sector information obtained by sectionalizing the indoor area into the predetermined number of sectors together with an interior drawing of the indoor area, the collection location information inputting unit displays the interior drawing and sector information on a display, and when a specific location on the display is selected by a user, extracts collection location information including any one of the building code, the sector identity code, the location coordinate, and the floor information of the specific location from the sector information.

23. The apparatus according to claim 20, wherein the access point collecting unit automatically sets at least one of a building code, a sector identity code, a location coordinate, and floor information based on the collection location.

24. The apparatus according to claim 20, further comprising:
a communication unit which communicates with a sectionalizing apparatus which sectionalizes an indoor area into a predetermined number of sectors and stores sector information,
wherein the collection location information inputting unit transmits the building code and the sector identity code of a collection location to the sectionalizing apparatus, and receives a location coordinate corresponding to the building code and sector identity code transmitted by the collection location information inputting unit.

25. The apparatus according to claim 24, wherein the collection location information inputting unit further transmit the floor information of the collection location to the sectionalizing apparatus, and receives a location coordinate corresponding to the building code, the sector identity code, and the floor information transmitted by the collection location information inputting unit.

26. The apparatus according to claim 24, wherein the location coordinate is latitude and longitude coordinates.

27. The apparatus according to claim 19, wherein the input of the collection location information corresponds to a position of the apparatus at the time of the input of the collection location information.

* * * * *